United States Patent [19]

Tsutsumi

[11] 4,413,598
[45] Nov. 8, 1983

[54] INTAKE CONTROL DEVICE FOR AUTOMOTIVE INTERNAL COMBUSTION ENGINE

[75] Inventor: Saburo Tsutsumi, Yokohama, Japan

[73] Assignee: Nissan Motor Co., Ltd., Kanagawa, Japan

[21] Appl. No.: 233,652

[22] Filed: Feb. 11, 1981

[30] Foreign Application Priority Data

Feb. 12, 1980 [JP] Japan .................................. 55-14801

[51] Int. Cl.³ ............................................ F02B 31/00
[52] U.S. Cl. .................................................... 123/306
[58] Field of Search ................ 123/52 M, 188 M, 306

[56] References Cited

U.S. PATENT DOCUMENTS

| 1,727,265 | 9/1929 | Aseltine ............................ 123/52 M |
| 3,318,292 | 5/1967 | Hideg ................................. 123/306 |
| 3,408,992 | 11/1968 | Von Seggern et al. ............. 123/306 |
| 4,015,577 | 3/1977 | Elsbett et al. ................... 123/188 M |
| 4,174,686 | 11/1979 | Shimizu et al. ................. 123/188 M |
| 4,228,772 | 10/1980 | Bakonyi .......................... 123/188 M |
| 4,256,062 | 3/1981 | Schafer ........................... 123/188 M |
| 4,308,830 | 1/1982 | Yamada et al. ................. 123/188 M |

FOREIGN PATENT DOCUMENTS

| 1576012 | 10/1970 | Fed. Rep. of Germany ... 123/188 M |
| 2035940 | 1/1972 | Fed. Rep. of Germany ...... 123/306 |
| 2921300 | 12/1979 | Fed. Rep. of Germany . |
| 2857252 | 1/1981 | Fed. Rep. of Germany . |
| 60523 | 2/1948 | Netherlands ........................ 123/306 |
| 332857 | 7/1930 | United Kingdom . |
| 1456318 | 11/1976 | United Kingdom . |

OTHER PUBLICATIONS

PCT WO79/00501, Inventors: Richard Alford; Alan R. Stockner, Title: Inlet Air Passage for an Engine, Publication Date 9th, Aug. 1979.

Primary Examiner—Craig R. Feinberg
Assistant Examiner—W. R. Wolfe
Attorney, Agent, or Firm—Lowe, King, Price & Becker

[57] ABSTRACT

An intake control device, for an internal combustion engine, to generate a strong swirl within each cylinder during light load engine operation without any substantial reduction in maximum power output. An intake port is divided by a partition wall into sub-passages extending parallel to each other, each being provided with a guide vane. The guide vanes are controlled in response to engine operating conditions.

7 Claims, 6 Drawing Figures

INTAKE CONTROL DEVICE FOR AUTOMOTIVE INTERNAL COMBUSTION ENGINE

BACKGROUND OF THE INVENTION

1. Field of the invention

The present invention relates to an intake control device for an internal combustion engine.

2. Description of the prior art

In a known intake control device, a guide vane is disposed in an induction passage and arranged to be generally parallel to a cylinder axis. This vane is movable to vary the cross sectional area of the induction passage, and accordingly increases the velocity of the incoming charge under any given operating condition and directs the charge into the combustion chamber so as to swirl about the axis of the cylinder. However, this arrangement has suffered from the drawback that the variable opening through which the charge flows is substantially rectangular and oriented with the longitudinal axis thereof essentially parallel with the cylinder axis. This accordingly introduces the charge into the combustion chamber with a relatively weak flow component in the plane normal to the cylinder axis. This has lead to the formation of a swirl within the combustion chamber which all but disappears as the piston approaches TDC during the combustion stroke, at which time the swirl has the most value in promoting efficient combustion.

SUMMARY OF THE INVENTION

The present invention features a plurality of sub-passages extending parallel to each other, and a plurality of guide vanes arranged in the sub-passages, respectively, to vary the cross sectional areas of the sub-passages. In each of the sub-passages, the variable opening through which the charge flows is substantially rectangular and oriented with the longitudinal axis thereof disposed within a plane generally normal to the cylinder axis. The guide vanes are rotatably moved in response to engine operation condition so as to introduce the charge into the combustion chamber with a strong flow component in a plane generally normal to the cylinder axis, thus generating a swirl which will persist even when the piston approaches TDC during the compression stroke.

BRIEF DESCRIPTION OF THE DRAWINGS

The features and advantages of the present invention will become more clearly appreciated from the following description taken in conjunction with the accompanying drawings in which like reference numerals designate corresponding elements, and in which.

DETAILED DESCRIPTION OF THE PREFERRED EMBODIMENTS

Figure 1:
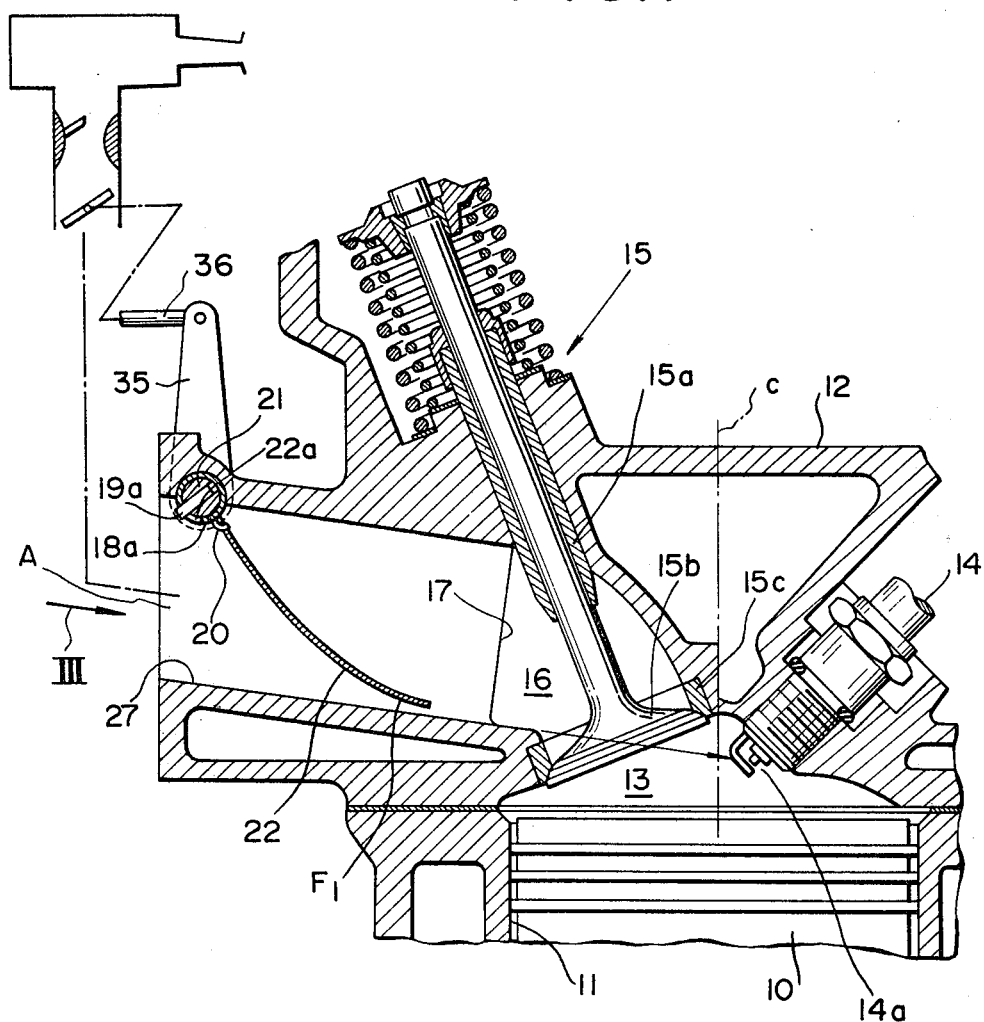
FIG. 1 is a sectional view showing a first embodiment of the present invention.
Figure 2:
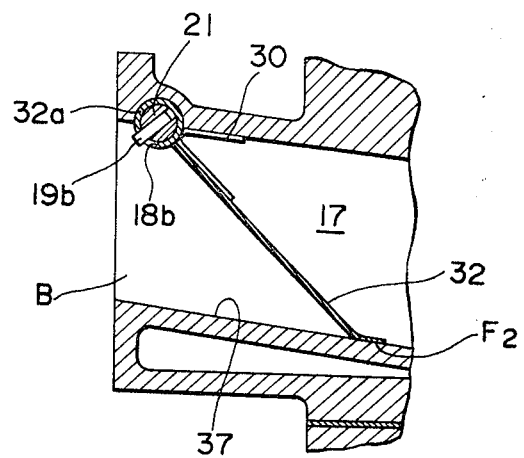
FIG. 2 is a sectional view taken through the line II—II of FIG. 3.
Figure 3:
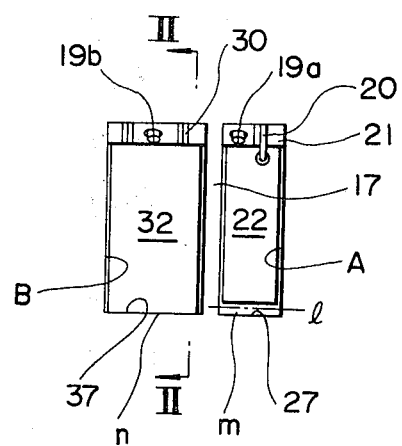
FIG. 3 is a view as shown in a direction of an arrow III shown in FIG. 1.

Referring to the drawings and more specifically to FIGS. 1 to 3, a first embodiment of the present invention is shown. In FIG. 1, the numeral 10 designates a piston slidably disposed within a cylinder block 11 to which a cylinder head 12 is fixedly secured to define a combustion chamber 13. Mounted to cylinder head 12 is a spark plug 14, an intake valve 15 and an exhaust valve, not shown.

Within an intake port 16 which communicates with combustion chamber 13 through intake valve 15, a partition wall 17 extends toward the intake valve to a position just upstream of a valve guide 15a. Partition wall 17 divides intake port 16 to define two sub-passages A, B which extend parallel to each other. Disposed respectively within sub-passages A, B are guide vanes 22, 32. Guide vanes 22, 32 have ring portions 22a, 32a thereof at their upstream edges rotatably mounted to cylinder head 12 via a pivot shaft 21 rotatably mounted within the cylinder in a direction generally perpendicular to cylinder axis C. Guide vanes 22, 32 define on one side thereof guide surfaces $F_1$, $F_2$. Ring portions 22a, 32a are formed with axially extending elongate cutouts 18a, 18b and shaft 21 has fixed thereto stop pins 19a, 19b extending into respective cutouts 18a, 18b.

Guide vane 22 is biased by a spring 20 in a counterclockwise direction, as seen in FIG. 1, around pivot shaft 21, (i.e. in a direction to open the sub-passage A), while the other guide vane 32 is biased by a spring 30 in a clockwise direction, as seen in FIG. 2 (i.e. in a direction to close the sub-passage B).

Movement of guide vane 22 in the opening direction due to the action of spring 20 is limited by the abutting engagement of cutout 18a of ring portion 22a with stop pin 19a. The guide vane 22 follows the rotational movement of the pivot shaft 21 in the counterclockwise direction (viewing in FIG. 1), thus increasing the opening of sub-passage A. In the case of the sub-passage B, in accordance with said rotational movement of pivot shaft 21, stop pin 19b pushes through the engagement with cutout 18b of ring portion 32a of guide vane 32 to rotatably move the guide vane against spring 30 in the counterclockwise direction (as seen in FIG. 2) to increase the opening of the sub-passage B.

The relative position of cutouts 18a, 18b is such that guide vane 32 begins to move in the opening direction when guide vane 22 has moved through a predetermined angle.

Pivot shaft 21 is operatively connected with an intake throttle valve of a carburetor through a link mechanism which includes a lever 35 and a rod 36.

Figure 4:
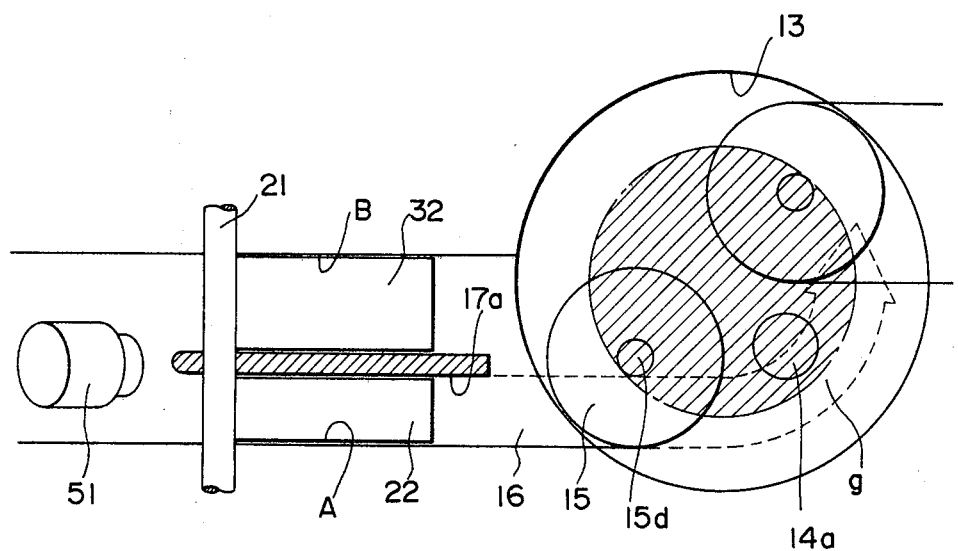
FIG. 4 is a schematic plan view showing a second embodiment wherein the present invention is combined with a fuel injector.
Figure 5:
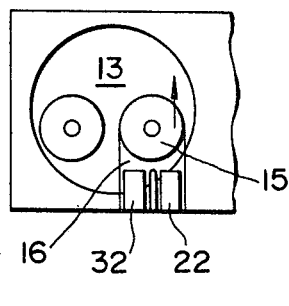
FIGS. 5 and 6 are schematic plan view showing possible intake port arrangements.
Figure 6:
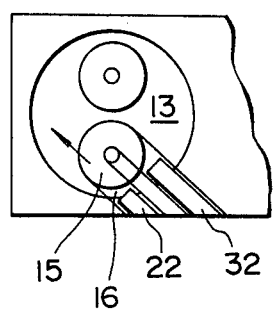

As best shown in FIG. 4, an extension of an imaginary center line of intake port 16 is offset with respect to cylinder axis C. Sub-passage A, which is disposed radially more remote from cylinder axis C than sub-passage B, has a relatively smaller cross sectional area and is used for operation under light or low load. Sub-passage B, which is disposed radially closer to cylinder axis C than the sub-passage A, has a relatively large cross sectional area and is used for operation under heavy load. As long as possible, intake port 16, particularly sub-passage A, extends in a tangential manner to the cylinder wall so as to facilitate the generation of a swirl within combustion chamber 13. Two examples of such intake port arrangements are shown in FIGS. 5 and 6.

The cross sectional shape of each sub-passage A, B is rectangular. The passage inner walls, including bottom walls 27, 37 and guide surfaces $F_1$, $F_2$ respectively formed at the trailing edges of the guide vanes 22, 32, define variable openings m, n. Bottom walls 27, 37 are flat and their imaginary extensions pass through a space between the bevel portion 15b of intake valve 15 when it is at its maximum open or lift position and its valve seat 15c. Bottom walls 27, 37 are so oriented to provide an arrangement whereby the charge is introduced into the combustion chamber in a direction generally normal to the cylinder axis to vary the area of the openings m, n. Openings m, n are always rectangular in shape and oriented with their longitudinal axes l in a plane generally normal to cylinder axis C. The distance between bottom walls 27, 37 and the trailing edges of guide vanes 22, 32 are variable as the guide vanes 22, 32 are rotatably moved.

The operation is explained hereinafter.

During the partial load operation, the sub-passage B is closed by guide vane 32. In sub-passage A, the deflector 22 moves away from the bottom wall 27 as pivot shaft 21 is rotated by carburetor throttle valve, thus varying the area of opening m in response to the carburetor throttle valve setting. Since the cross-sectional shape of opening m is rectangular and oriented with the longitudinal axis l thereof disposed in a plane generally normal to cylinder axis C, the flow of charge introduced into combustion chamber 13 passes through a space between bevel portion 15b of intake valve 15 and valve seat 15c in the form of a jet having a rectangular cross section and having a relatively strong flow component disposed within the plane generally normal to the cylinder axis C, thus generating a strong swirl within the combustion chamber 13. Particularly, since, under an operating condition with light load, the cross sectional area of the variable opening m is reduced, the strengthened swirl is generated to promote mixing of the charge and to increase combustion speed due to an increase in eddies. Thus, the lean limit of the air fuel mixture and the EGR limit are extended, resulting in enhanced thermal efficiency.

When pivot shaft 21 is rotatably moved through a predetermined angle in response to an opening of the carburetor throttle valve in a direction to increase area of opening m, the stop pin 19b comes into contact with the edge of cutout 18b of ring portion 32a. Further rotational movement of pivot shaft 21 causes rotational movement of guide vane 32 against spring 30 in the opening direction to increase the area of opening n defined within sub-passage B. Since longitudinal axis l of opening n is disposed within the plane generally normal to cylinder axis C, the charge passing through opening n is introduced into combustion chamber 13 in the form of a jet having a rectangular cross section and a strong flow component disposed in the plane generally normal to the cylinder axis C, thus generating a strong swirl within the combustion chamber and contributing to the improvement in combustion during operation with intermediate load.

When the throttle valve is in the fully opened position, guide vanes 22, 32 abut the upper wall of intake port 16. Charging efficiency under full load operation is assured by fully opening the cross-sectional area of intake port 16. Hence, maximum power output of the engine is assured.

Since the cross-sectional shapes of openings m, n are rectangular, a good seal effectiveness between guide vane 22 and sub-passage A and between guide vane 32 and sub-passage B is provided. Therefore, a strong swirl with a strong flow component within the plane generally normal to the cylinder axis C is generated. Further, the flow of charge through sub-passage B can be prevented with guide vane 32.

The reason the cross sectional area of sub-passage A (disposed relatively remote from cylinder axis C) is smaller than that of sub-passage B is to increase the flow component along the cylinder wall during partial load operation by allowing the charge to pass through the sub-passage A only, thus generating a strong swirl within combustion chamber 13.

As shown in FIG. 4, the remote side surface 17a of partition wall 17 is aligned with respect to cylinder axis C with the valve stem 15d surface in the direction of the flow of the charge. Therefore, the jet of air having past through the sub-passage A is introduced into the combustion chamber 13 without impinging upon the valve stem 15d.

Since the angular positions of the guide vanes 22, 32 are varied in response to the engine load, the conventional problem that the engine operation is not stable and fuel economy is poor during idling or under low speed with light load because under these conditions the flow of gas is weak so that the mixture is not mixed well and the combustion speed is low, has been solved by increasing the strength of a swirl within the combustion chamber 13. When the engine operates with a heavy load such as when the throttle valve is fully opened, the guide vanes 22, 32 are held in their fully opened positions so that a reduction in the maximum power output is prevented.

Although in the previously described embodiment, the opening movement of the guide vanes 22, 32 are effected with a predetermined phase therebetween, it is also possible and very effective in generating a strong swirl with a strong flow component within the plane generally normal to the cylinder axis C to fix the guide vane 22 at a predetermined angular position until the other guide vane 32 reaches the same angular position and thereafter moves simultaneously with the guide vane 32.

The shape of each intake air guide surfaces $F_1$, $F_2$ is disposed to provide a smooth flow of charge therethrough.

A spark plug 14 for each combustion chamber 13 should be located such that a spark gap 14a thereof (see FIGS. 1 and 4) communicates with a region within the combustion chamber 13 which is defined by the center line g of the jet of air introduced into combustion chamber 13 from the more remote sub-passage A.

With this spark plug arrangement, a reduction in temperature of the electrodes of spark plug 14 is avoided because the electrodes are disposed out of the path of the swirl of charge during light load engine operation. Under heavy load engine operation, the fresh charge introduced from sub-passage B which is disposed nearer to the cylinder axis C cools or scavanges the electrodes of spark plug 14, thus preventing overheating of same.

In the case of fuel injection internal combustion engines, as shown in FIG. 4, a fuel injection nozzle 51 should be arranged to direct a jet of fuel toward an upstream edge of partition wall 17, so as to properly distribute fuel between sub-passages A and B.

It will be understood that according to the invention, a strong swirl with a strong flow component within plane generally normal to cylinder axis C is generated within combustion chamber 13. Thus, depending on the engine operating conditions, the flow of charge within combustion chamber 13 can be controlled in an optimum manner, thus extending the lean limit and EGR limit so as to reduce emissions of NO$_x$, HC, CO and the like.

Because of an increase in the flame propagation speed, the combustion of lean air fuel mixture or air fuel mixture with high EGR is possible, resulting in high thermal efficiency and good fuel economy. In addition, idling operation is stabilized and the warm-up period is shortened.

It will also be understood that by controllably opening sub-passages A, B, the strong swirling flow is generated during low load engine operation without any substantial reduction in maximum power output.

What is claimed is:

1. An internal combustion engine comprising:
   a cylinder having a longitudinal axis and a piston slidably movable within said cylinder to define a variable volume combustion chamber;
   an induction passage leading from said combustion chamber to the ambient atmosphere, said induction passage being oriented with respect to said cylinder so as to introduce a fluid charge transmitted therethrough into said combustion chamber tangentially with respect to the cylinder wall so that the charge enters said combustion chamber and swirls about said cylinder axis;
   a throttle valve disposed within the induction passage for controlling the flow of fluid therethrough;
   an intake valve having a stem for controlling fluid communication between the induction passage and said combustion chamber;
   a partition disposed in said induction passage for dividing said passage into first and second substantially rectangular cross-section subpassages, said partition being oriented so that a surface thereof defining part of said first subpassage is longitudinally aligned with a surface of said intake valve stem so that fluid flowing through said first subpassage is prevented from impinging upon said valve stem;
   a first substantially rectangular guide vane disposed in said first subpassage;
   a second substantially rectangular guide vane disposed in said second subpassage;
   said first and second guide vanes defining first and second variable cross-section openings in said first and second subpassages respectively, said first and second variable cross-section openings each having an essentially rectangular cross-section being elongated in a direction parallel with a plane normal to said cylinder axis so that the flow component in said plane normal to said cylinder axis is minimized; and
   control means interconnecting said throttle valve with said first and second vanes, said control means including a common shaft carrying said first and second vanes and a lost motion arrangement enabling said second vane to remain closed until said first vane has opened by a predetermined amount whereafter said first and second vanes are moved synchronously.

2. An internal combustion engine comprising;
   a cylinder having a longitudinal axis and a piston slidably movable within said cylinder to define a variable volume combustion chamber;
   an induction passage leading from said combustion chamber to the ambient atmosphere, said induction passage being oriented with respect to said cylinder so as to introduce a fluid charge transmitted therethrough into said combustion chamber tangentially with respect to the cylinder wall so that the charge enters said combustion chamber and swirls about said cylinder axis;
   a single throttle valve disposed within the induction passage for controlling the flow of fluid therethrough;
   an intake valve having a stem for controlling fluid communication between the induction passage and said combustion chamber;
   a partition disposed in said induction passage for dividing said passage into first and second substantially rectangular cross-section sub-passages, said partition being oriented so that a surface thereof defining part of said first sub-passage is longitudinally aligned with a surface of said intake valve stem so that fluid flowing through said first sub-passage is prevented from impinging upon said valve stem;
   a first substantially rectangular guide vane disposed in said first sub-passage;
   a second substantially rectangular guide vane disposed in said second sub-passage;
   said first and second guide vanes defining first and second variable cross section openings in said first and second sub-passages respectively, said first and second variable cross section openings each having an essentially rectangular cross section being elongate in a direction parallel with a plane normal to said cylinder axis so that the flow component in said plane normal to said cylinder axis is maximized; and
   control means interconnecting said throttle valve with said first and second vanes, said control means including a common shaft carrying said first and second vanes and a lost motion arrangement enabling said second vane to remain closed until said first vane has opened by a predetermined amount whereafter said first and second vanes are moved synchronously.

3. An internal combustion engine as claimed in claim 2, further comprising a spark plug disposed within said combustion chamber so that electrodes thereof are located in a zone defined about said cylinder axis by an imaginary center line of the swirl generated by the fluid introduced into said combustion chamber through said first sub-passage and in the path of the fluid flowing through said second sub-passage.

4. An internal combustion engine as claimed in claim 2, further comprising a fuel injector disposed within said induction passage upstream of said partition, said injector being aimed at an upstream edge of said partition.

5. An internal combustion engine as claimed in claim 2, wherein said lost motion arrangement includes:
   first and second envelopes formed on said first and second vanes respectively, said first and second envelopes enclosing said shaft therein and being further formed with first and second elongate cut-out respectively;
   first and second pins extending from said shaft into said first and second cut-outs respectively;
   a first spring biasing said first vane in a first rotational direction about said shaft, and
   a second spring biasing said second vane in a second rotational direction about said shaft.

6. An internal combustion engine as claimed in claim 2, wherein said intake valve includes a head and a valve seat, the bottom of said induction passage being located such that an imaginary planar extension thereof passes between said valve head and said valve seat when said valve is in an open position.

7. An internal combustion engine as claimed in claim 2, wherein said first sub-passage is disposed farther from said cylinder axis than said second sub-passage.

* * * * *